United States Patent [19]
Terashima et al.

[11] Patent Number: 5,102,576
[45] Date of Patent: Apr. 7, 1992

[54] FERROELECTRIC LIQUID CRYSTAL COMPOSITION

[75] Inventors: Kanetsugu Terashima, Ichiharashi; Makoto Kikuchi, Kisarazushi; Katsuyuki Murashiro, Ichiharashi, all of Japan

[73] Assignee: Chisso Corporation, Japan

[21] Appl. No.: 608,739

[22] Filed: Nov. 5, 1990

[30] Foreign Application Priority Data

Nov. 7, 1989 [JP] Japan .................. 1-289196

[51] Int. Cl.$^5$ .................. C09K 19/52; G02F 1/13
[52] U.S. Cl. .................. 252/299.01; 359/104
[58] Field of Search .......... 252/299.01, 299.6, 299.61, 252/299.62, 299.63, 299.64, 299.65, 299.66, 299.67; 350/350 S; 359/104

[56] References Cited

U.S. PATENT DOCUMENTS 4,952,335  8/1990  Furukawa .................. 252/299.61
5,047,171  9/1991  Ohno et al. .................. 252/299

FOREIGN PATENT DOCUMENTS 61291679 12/1986 Japan .
8906266  7/1989 World Int. Prop. O. .

Primary Examiner—Robert L. Stoll
Assistant Examiner—Shean C. Lu
Attorney, Agent, or Firm—Leydig, Voit & Mayer

[57] ABSTRACT

A ferroelectric liquid crystal composition comprising achiral smectic liquid crystal compounds(s) and optically active compounds and, which composition comprises the following components A, B and C in 50-91%, 4-30% and 5-20%, each by weight, respectively:

Component A: at least one of compounds of the formula (A) having smectic C phase $R^1$ and $R^2$ each are same or different, linear or branched alkyl, alkoxy or alkanoyloxy each of 1-18 C, X is H, halogen or CN, l, m and n each one 1 or 2 and the sum of l, m and n is 1 or 2, component B: at least one of optically active compounds of the formula (B):

and
component C: at least one of optically active compounds of the formula wherein each $R^3$ and $R^5$ is a linear or branched alkyl or alkoxy of 1-18C, each $R^4$ and $R^6$ is a linear or branched alkyl of 2-18C or a linear or branched alkoxy of 1-18C, each Y and Z is H, halogen or CN, k is 0 or 1 and * is asymmetric C, the compounds having the same sense of Ps in chiral smectic C phase, induced when dissolved in smectic C liquid crystal.

6 Claims, No Drawings

FERROELECTRIC LIQUID CRYSTAL COMPOSITION

BACKGROUND OF THE INVENTION

1. Field of the Invention

This invention relates to a ferroelectric liquid crystal material. More particularly it relates to a ferroelectric liquid crystal composition comprising achiral smectic liquid crystal compound(s) and optically-active compounds and having quick response properties, and to a light-switching element containing the composition.

2. Description of the Related Art

Liquid crystal compounds have been broadly used as materials for display elements, but most of such liquid crystal display elements are of the TN display mode and as liquid crystal materials, those belonging to nematic phase have been used.

The TN display mode has characteristics resulting in the eyes are not being tired due to non-emissive mode and the power consumption is very small, but to the contrary has drawbacks that the response is slow and the viewing angle of the display is narrow.

However, recently the mode has been used in flat displays, and thus quick response properties and a broad viewing angle have been particularly required therefor.

In order to satisfy such requirements, improvement in liquid crystal materials has been attempted. However, as the compared with other emissive mode displays such as electroluminescent display, plasma display, etc., the TN display mode is observed to have large differences from the former in the aspects of response time and width of viewing angle.

In order to make use of the specific features of non-emissive mode and a small power comsumption and yet to secure response properties matching the emissive mode display, development of a novel liquid crystal display mode in place of the TN display mode is indispensable.

As one of such attempts, a display mode utilizing the light-switching phenomenon of ferroelectric liquid crystals was proposed by N.A. Clark and S.T. Lagewall (see Applied Physics Letters, Vol. 36, p. 899 (1980)).

As to ferroelectric liquid crystals, their presence was announced by R.B. Meyer et al for the first time (see Journal de Physique, Vol. 36, p. 69, 1975), and in the aspect of liquid crystalline structure, their phases belong to chiral smectic C phase, chiral smectic I phase, chiral smectic F phase, chiral smectic G phase, chiral smectic H phase, chiral smectic J phase or chiral smectic K phase (hereinafter abbreviated to Sc* phase, $S_I$* phase, $S_F$* phase, $S_G$* phase, $S_H$* phase, $S_J$* phase or $S_K$* phase, respectively).

When the light-switching phenomenon of ferroelectric liquid crystals is applied to display elements, the resulting display elements have two superior specific features as compared with the TN display mode. The first specific feature consists in that the elements respond at a very high speed and the response is more rapid by about $10^3$ to $10^4$ times than elements of TN display mode. The second specific feature consists in a memory effect which makes multiplex drive easy coupled with the above quick response properties.

Among the chiral smectic phases, the Sc* phase has now been particularly noted.

When ferroelectric liquid crystals are applied to display devices, the following conditions required for liquid crystal materials are exemplified:

① A Sc* phase is exhibited within a broad temperature range including room temperature (at least 0° to 50° C.).

② Display elements of 640×400 lines or more are required to exhibit a response time of 100 μsec or less.

The response time ($\tau$) of a ferroelectric liquid crystal in an electric field (E) is expressed by the equation $$\tau = \frac{\eta}{Ps \cdot E}$$

wherein $\eta$ is viscosity and Ps is spontaneous polarization.

Thus in order to realize the quick response properties, liquid crystal materials are required to exhibit a large spontaneous polarization value.

③ In order to realize the memory effect according to N.A. Clark et al, it is necessary to bring the cell gap (d) into the helical pitch (P) or less and untwist the helix (see Appl. Phys. Lett. 36 (1980) 899). Thus, in order to utilize a cell of having a thick cell gap which is easy to prepare, it is necessary to prolong the helical pitch of ferroelectric liquid crystals. ④ The aligning state of ferroelectric liquid crystals varies depending upon the phase series of liquid crystal materials, and at present, in the case of the aligning technique employed for TN liquid crystal materials (surface treatment method), liquid crystal materials having a smectic A phase and cholesteric phase (hereinafter abbreviated to $S_A$ phase and N* phase, respectively) on the higher temperature side relative to Sc* phase have been regarded to afford the best aligning state. Namely, the phase series of ferroelectric liquid crystals is preferred to be isotropic liquid (hereinafter abbreviated to Iso)→N*→$S_A$→Sc* (for example, see Japanese patent application laid-open No. Sho 61-250086).

Further, among liquid crystal materials having such a phase series, those having a N* phase of a longer pitch have been regarded to exhibit a better aligning state (for example, see Japanese patent application laid-open No. Sho 61-255323).

Besides the above-mentioned conditions, there are various requirements for the tilt angle ($\theta$) of liquid crystal molecules, etc.

As to conventional ferroelectric liquid crystal materials, even when only the temperature range is referred to, practical materials are few, and it is the present status that materials satisfying all of the above conditions and durable to practical use are almost none.

For example, Japanese patent application laid-open No. Sho 61-291,679 and PCT international application laid-open No. WO 86/06401 (pamphlet) disclose ferroelectric liquid crystal compositions obtained by combining an achiral phenylpyrimidine compound having a smectic C phase (hereinafter abbreviated to Sc phase) with an optically active compound, which compositions exhibit a Sc* phase within a broad temperature range including room temperature and a phase series of $I_{so}$→N*→$S_A$→Sc*. However, the ferroelectric liquid crystal compositions disclosed in such publications satisfy the above-mentioned requirements in the aspect of the temperature range of the Sc* phase and the phase series, but the response time is 300 to 500 μsec (e.g., see ferroelectric liquid crystal compositions described in Examples 1 and 2 of the above Japanese patent application laid-open No. Sho 61-291679 or Examples 45 and 46 of the above PCT international application laid-open No. WO 86/06401) and hence the response time is not practical.

As apparent from the foregoing, it is the present status that ferroelectric liquid crystal materials satisfying all of the above-mentioned conditions and hence applicable to display devices are almost none.

SUMMARY OF THE INVENTION

As apparent from the foregoing, a first object of the present invention is to provide a ferroelectric liquid crystal composition exhibiting a Sc* phase within a broad temperature range including room temperature and having quick response properties of including a response time of 100 μsec or less. A second object thereof is to provide a light-switching element containing the above liquid crystal composition and having quick response properties.

The present inventors have made extensive research in order to solve the above-mentioned problems and as a result have found that when an achiral phenylpyrimidine compound is combined with a set of optically active compounds each having a large spontaneous polarization value and the same polarity, but a reverse helical twisted sense to each other, then it is possible to obtain a ferroelectric liquid crystal composition exhibiting a Sc* phase within a broad temperature range including room temperature, easily affording a superior alignment and yet having quick response properties including a response time of 100 μsec or less.

The present invention has a main constitution described in the following item (1) and its embodiments described in the following items (2) to (8):

(1) A ferroelectric liquid crystal composition comprising at least three components including the following compoments A, B and C, the respective concentrations of said components A, B and C being 50 to 91% by weight, 4 to 30% by weight and 5 to 20% by weight, respectively based upon the total quantity of said three components:

component A being at least one member selected from compounds expressed by the formula

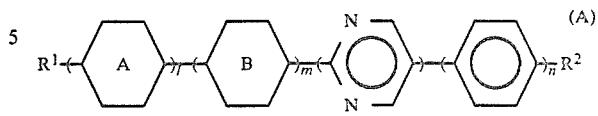

wherein 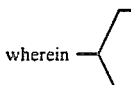 and 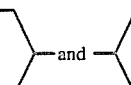 each independently represent 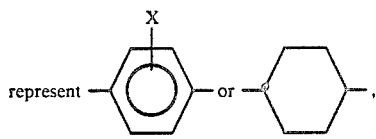

$R^1$ and $R^2$ each represent the same or different, linear or branched alkyl group, alkoxy group or alkanoyloxy group each of 1 to 18 carbon atoms, X represents a hydrogen atom, a halogen atom or a cyano group, l, m and n each independently are 0 or 1 and the sum of l, m and n is 1 or 2; the compounds having a smectic C phase;

component B being at least one member selected from optically active compounds expressed by the formula

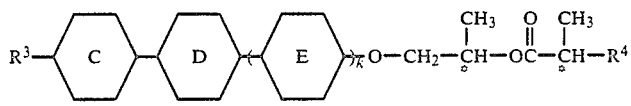

wherein ,  and  each independently represent 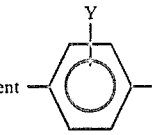,

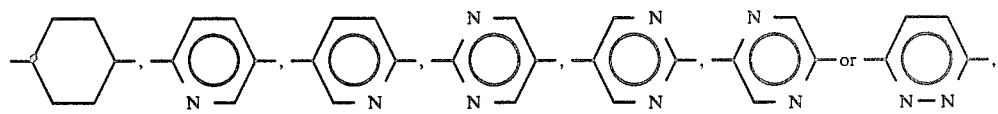

$R^3$ represents a linear or branched alkyl group or alkoxy group each of 1 to 18 carbon atoms, $R^4$ represents a linear or branched alkyl group of 2 to 18 carbon atoms or a linear or branched alkoxy group of 1 to 18 carbon atoms, Y represents a hydrogen atom, a halogen atom or a cyano group, k represents 0 or 1 and * represents an asymmetric carbon atom, the optically active compounds having the same sense of spontaneous polarization in a chiral smectic C phase, induced when dissolved in smectic C liquid crystal; and component C being at least one member selected from optically active compounds expressed by the formula

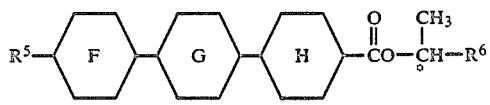

(C)

wherein —⬡F⬡—, —⬡G⬡— and —⬡H⬡— each independently represent

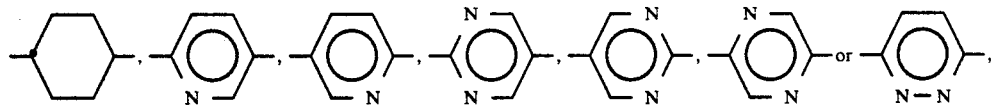

$R^5$ represents a linear or branched alkyl group or alkoxy group each of 1 to 18 carbon atoms, $R^6$ represents a linear or branched alkyl group each of 2 to 18 carbon atoms or a linear or branched alkoxy group of 1 to 18 carbon atoms, Z represents a hydrogen atom, a halogen atom or a cyano group and * represents an asymmetric carbon atom, and said the optically active compounds having the same sense of spontaneous polarization in the chiral smectic C phase, induced when dissolved in smectic C liquid crystal, as that of compounds of component B.

(2) A ferroelectric liquid crystal composition according to item (1), wherein component A is at least one member selected from the group consisting of compounds expressed by the formula

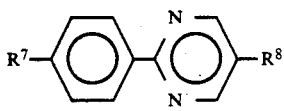  (A-I)

wherein $R^7$ and $R^8$ each represent the same or different, linear or branched alkyl group, alkoxy group or alkanoyloxy group each of 1 to 18 carbon atoms and compounds expressed by the formula

  (A-II)

wherein $R^9$ and $R^{10}$ each represent the same or different, linear or branched alkyl group or alkoxy group each of 1 to 18 carbon atoms, and both of which compounds (A-I) and (A-II) having a smectic C phase.

(3) A ferroelectric liquid crystal composition according to item (1), wherein component B is at least one member selected from the group consisting of optically active compounds expressed by the following three formulas and having the same sense of spontaneous polarization in a chiral smectic C phase, induced when dissolved in a smectic C liquid crystal:

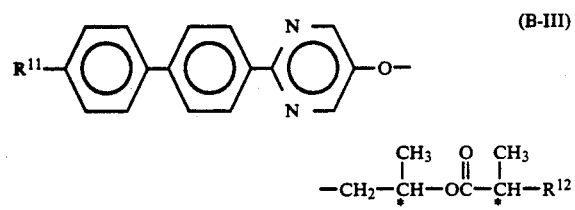  (B-III)

  (B-IV)

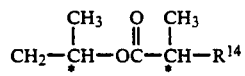

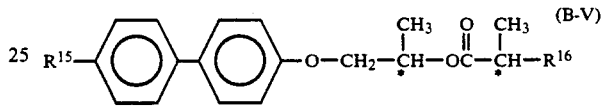  (B-V)

wherein $R^{11}$, $R^{13}$ and $R^{15}$ each represent a linear or branched alkyl group or alkoxy group each of 1 to 18 carbon atoms, $R^{12}$, $R^{14}$ and $R^{16}$ each represent a linear or branched alkyl group each of 2 to 18 carbon atoms or a linear or branched alkoxy group each of 1 to 18 carbon atoms and * represents an asymmetric carbon atom.

(4) A ferroelectric liquid crystal composition according to item (1), wherein component C is at least one member selected from the group consisting of optically active compounds expressed by the following formulas and having the same sense of spontaneous polarization in a chiral smectic C phase, induced when dissolved in a smectic C liquid crystal, as that of said component B:

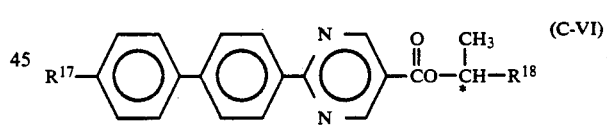  (C-VI)

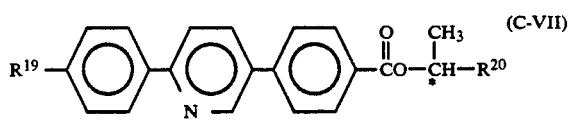  (C-VII)

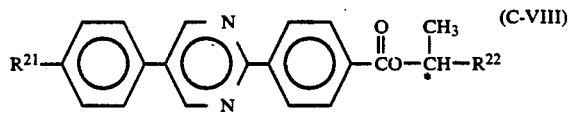  (C-VIII)

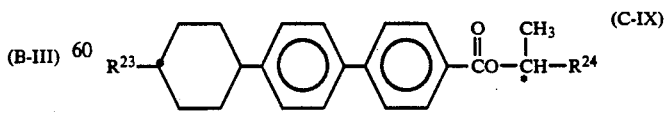  (C-IX)

wherein $R^{17}$, $R^{19}$, $R^{21}$ and $R^{23}$ each represent a linear or branched alkyl group or alkoxy group each of 1 to 18 carbon atoms, $R^{18}$, $R^{20}$, $R^{22}$ and $R^{24}$ each represent a linear or branched alkyl group each of 2 to 18 carbon atoms or a linear or branched alkoxy group each of 1 to 18 carbon atoms and * represents an asymmetric carbon atom.

(5) A ferroelectric liquid crystal composition according to item (1), wherein component A is at least one member selected from the groups consisting of compounds expressed by the formula

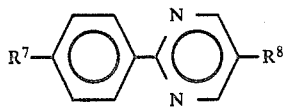 (A-I')

wherein $R^7$ represents a linear alkyl group, alkoxy group or alkanoyloxy group each of 5 to 14 carbon atoms and $R^8$ represents a linear alkyl group or alkoxy group each of 6 to 16 carbon atoms, and compounds expressed by the formula

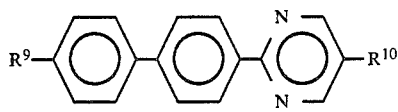 (A-II')

wherein $R^9$ and $R^{10}$ each represent a linear alkyl group or alkoxy group each of 5 to 10 carbon atoms, and both of which compounds (A-I') and (A-II') having a smectic C phase.

(6) A ferroelectric liquid crystal composition according to item (1), wherein component A is at least one member selected from the group consisting of compounds expressed by the formula

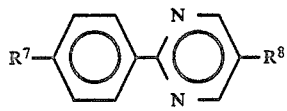 (A-I'')

wherein $R^7$ represents a linear alkoxy group of 6 to 12 carbon atoms and $R^8$ represents a linear alkyl group of 7 to 15 carbon atoms, and compounds expressed by the formula

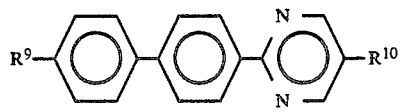 (A-II'')

wherein $R^9$ represents a linear alkyl group or alkoxy group of 5 to 8 carbon atoms and $R^{10}$ represents a linear alkyl group of 6 to 8 carbon atoms, and both of which compounds (A-I') and (A-II') having a smectic C phase.

(7) A ferroelectric liquid crystal composition according to item (1), wherein component B is at least one member selected from the group consisting of optically active compounds expressed by the following three formulas and having the same sense of spontaneous polarization in a chiral smectic C phase, induced when dissolved in a smectic C liquid crystal:

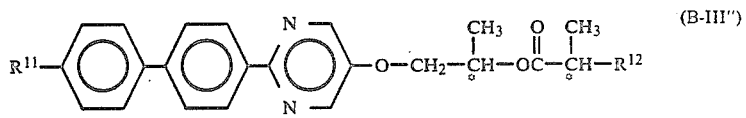 (B-III'')

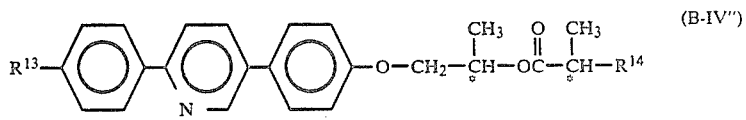 (B-IV'')

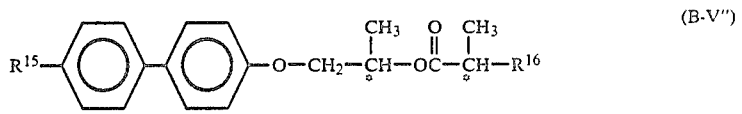 (B-V'')

wherein $R^{11}$ and $R^{13}$ each represent a linear alkyl group or alkoxy group, each of 3 to 10 carbon atoms, $R^{15}$ represents a linear alkyl group or alkoxy group each of 3 to 12 carbon atoms, $R^{12}$, $R^{14}$ and $R^{16}$ each represent a linear alkyl group or alkoxy group each of 2 to 10 carbon atoms and * represents an asymmetric carbon atom.

(8) A ferroelectric liquid crystal composition according to item (1), wherein component C is at least one member selected from the group consisting of optically active compounds expressed by the following four formulas and having the same sense of spontaneous polarization in chiral smectic C phase, induced when dissolved in a smectic C liquid crystal, to that of the compound of said component B:

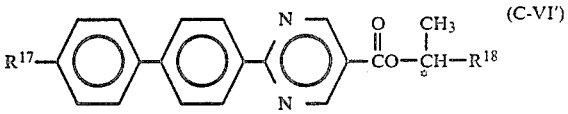 (C-VI')

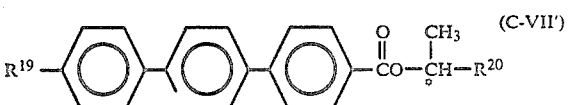 (C-VII')

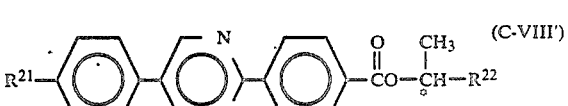 (C-VIII')

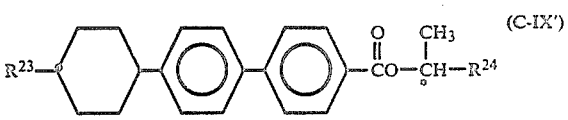 (C-IX')

wherein $R^{17}$, $R^{19}$, $R^{21}$ and $R^{23}$ each represent a linear alkyl group, or alkoxy group each of 3 to 12 carbon atoms, $R^{18}$, $R^{20}$, $R^{22}$ and $R^{24}$ each represent a linear alkyl group of 2 to 10 carbon atoms and * represents an asymmetric carbon atom.

The present invention in a second aspect consists in (9) a light-switching element containing a ferroelectric liquid crystal composition as set forth in either one of items (1) to (8).

DETAILED DESCRIPTION OF PREFERRED EMBODIMENTS

The compound expressed by the formula (A) described in the above item (1) includes known compounds and achiral compounds abundant in smectic C liquid crystal properties. The first role of these achiral liquid crystals in the ferroelectric liquid crystal composition of the present invention is to secure smectic C phase exhibiting ferroelectricity over a broad temperature range, and in the aspect of this role, these achiral liquid crystals are called a base Sc liquid crystal. The second role of the component A compound is to cause a phase transition series of Iso-N*-$S_A$-Sc* to form in the composition.

As the compound of component A, compounds expressed by the formulas (A-I) or (A-II) may be concretely mentioned. For example, compounds expressed by the formula (A-I) exhibit a Sc phase within a relatively low temperature region in the vicinity of room temperature, while compounds expressed by the formula (A-II) exhibit a Sc phase within a relatively high temperature region (for example, in the case of compounds of the formula (A-I) wherein $R^7 = C_6H_{13}O-$ and $R^8 = -C_8H_{17}$, phase transition points: Cr 28 Sc 47 $S_A$ 58 N 66 Iso, and in the case of compounds of the formula (A-II) wherein $R^9 = C_6H_{15}-$ and $R^{10} = -C_8H_{17}$, phase transition points: Cr 58 Sc 134 $S_A$ 144 N 157 Iso). Thus, when compounds of the formula (A-I) are combined with those of the formula (A-II), a base Sc mixture having a Sc phase over a broad temperature region from a low temperature region to a high temperature region is obtained. Thus, while compounds having a Sc phase are preferably used, even compounds exhibiting no Sc phase may be used in a quantity in which the temperature range of Sc* phase is not notably narrowed. Further, compounds expressed by the formulas (A-I) or (A-II) have a $S_A$ phase and nematic phase (hereinafter abbreviated to N phase) on the higher temperature side relative to Sc phase; hence the compounds play an important role of causing a phase series of Iso-N*-$S_A$-Sc* to appear in the ferroelectric liquid crystal composition of the present invention.

As the compounds expressed by the formula (A), those of the formula (A-I) wherein $R^7$ represents a linear alkyl group, alkoxy group or alkanoyloxy group each of 5 to 14 carbon atoms and $R^8$ represents a linear alkyl group or alkoxy group, each of 6 to 16 carbon atoms, and those of the formula (A-II) wherein $R^9$ and $R^{10}$ each represent the same or different, linear alkyl group or alkoxy group each of 5 to 10 carbon atoms, are preferred. Particularly preferred compounds are those of the formula (A-I) wherein $R^7$ represents a linear alkoxy group of 6 to 12 carbon atoms and $R^8$ represents a linear alkyl group of 7 to 15 carbon atoms and those of the formula (A-II) wherein $R^9$ represents a linear alkyl group or alkoxy group each of 5 to 8 carbon atoms and $R^{10}$ represents a linear alkyl group of 6 to 8 carbon atoms. In the present invention, a plurality, preferably at least 4 of these pyrimidine compounds are preferably used. Particularly preferred pyrimidine compounds exhibiting Sc phase are illustrated in Tables 1 and 2.

TABLE 1

Compounds expressed by

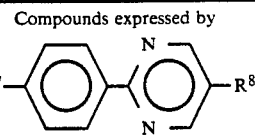

| $R^7$ | $R^8$ | $R^7$ | $R^8$ |
|---|---|---|---|
| $C_6H_{13}O-$ | $C_8H_{17}-$ | $C_7H_{15}O-$ | $C_9H_{19}-$ |
| " | $C_9H_{19}-$ | " | $C_{10}H_{21}-$ |
| " | $C_{10}H_{21}-$ | " | $C_{11}H_{23}-$ |
| " | $C_{11}H_{23}-$ | $C_8H_{17}O-$ | $C_8H_{17}-$ |
| $C_8H_{17}O-$ | $C_9H_{19}-$ | $C_{12}H_{25}O-$ | $C_7H_{15}-$ |
| " | $C_{10}H_{21}-$ | " | $C_8H_{17}-$ |
| " | $C_{11}H_{23}-$ | $C_5H_{11}COO-$ | $C_8H_{17}-$ |
| $C_9H_{19}O-$ | $C_7H_{15}-$ | $C_6H_{13}COO-$ | " |
| " | $C_8H_{17}-$ | $C_7H_{15}COO-$ | " |
| " | $C_9H_{19}-$ | $C_8H_{17}COO-$ | " |
| " | $C_{10}H_{21}-$ | $C_9H_{19}COO-$ | " |
| $C_{10}H_{21}O-$ | $C_8H_{17}-$ | $C_{10}H_{21}COO-$ | " |
| $C_{11}H_{23}O-$ | $C_7H_{15}-$ | $C_{11}H_{23}COO-$ | " |
| " | $C_8H_{17}-$ | | |
| $C_6H_{13}-$ | $C_7H_{15}O-$ | $C_8H_{17}-$ | $C_9H_{19}O-$ |
| " | $C_8H_{17}O-$ | " | $C_{10}H_{21}O-$ |
| " | $C_9H_{19}O-$ | " | $C_{11}H_{23}O-$ |
| " | $C_{10}H_{21}O-$ | " | $C_{12}H_{25}O-$ |
| " | $C_{11}H_{23}O-$ | " | $C_{13}H_{27}O-$ |
| " | $C_{12}H_{25}O-$ | $C_9H_{19}-$ | $C_8H_{17}O-$ |
| " | $C_{13}H_{27}O-$ | " | $C_9H_{19}O-$ |
| " | $C_{14}H_{29}O-$ | " | $C_{10}H_{21}O-$ |
| " | $C_{15}H_{31}O-$ | " | $C_{11}H_{23}O-$ |
| $C_7H_{15}-$ | $C_7H_{15}O-$ | " | $C_{12}H_{25}O-$ |
| " | $C_8H_{17}O-$ | " | $C_{13}H_{27}O-$ |
| " | $C_9H_{19}O-$ | $C_{10}H_{21}-$ | $C_8H_{17}O-$ |
| " | $C_{10}H_{21}O-$ | " | $C_9H_{19}O-$ |
| " | $C_{11}H_{23}O-$ | " | $C_{10}H_{21}O-$ |
| " | $C_{12}H_{25}O-$ | " | $C_{11}H_{23}O-$ |
| $C_8H_{17}-$ | $C_7H_{15}O-$ | " | $C_{12}H_{25}O-$ |
| " | $C_8H_{17}O-$ | | |
| $C_5H_{11}O-$ | $C_6H_{13}O-$ | $C_9H_{19}O-$ | $C_7H_{15}O-$ |
| " | $C_7H_{15}O-$ | " | $C_8H_{17}O-$ |
| " | $C_8H_{17}O-$ | " | $C_9H_{19}O-$ |
| " | $C_9H_{19}O-$ | " | $C_{10}H_{21}O-$ |
| " | $C_{10}H_{21}O-$ | " | $C_{11}H_{23}O-$ |
| " | $C_{11}H_{23}O-$ | " | $C_{12}H_{25}O-$ |
| " | $C_{12}H_{25}O-$ | $C_{10}H_{21}O-$ | $C_6H_{13}O-$ |
| $C_6H_{13}O-$ | $C_6H_{13}O-$ | " | $C_7H_{15}O-$ |
| " | $C_7H_{15}O-$ | " | $C_8H_{17}O-$ |
| " | $C_8H_{17}O-$ | " | $C_9H_{19}O-$ |
| " | $C_9H_{19}O-$ | " | $C_{10}H_{21}O-$ |
| " | $C_{10}H_{21}O-$ | " | $C_{11}H_{23}O-$ |
| " | $C_{11}H_{23}O-$ | " | $C_{12}H_{25}O-$ |
| " | $C_{12}H_{25}O-$ | $C_{11}H_{23}O-$ | $C_6H_{13}O-$ |
| $C_7H_{15}O-$ | $C_6H_{13}O-$ | " | $C_7H_{15}O-$ |
| " | $C_7H_{15}O-$ | " | $C_8H_{17}O-$ |
| " | $C_8H_{17}O-$ | " | $C_9H_{19}O-$ |
| " | $C_9H_{19}O-$ | " | $C_{10}H_{21}O-$ |
| " | $C_{10}H_{21}O-$ | " | $C_{11}H_{23}O-$ |
| " | $C_{11}H_{23}O-$ | " | $C_{12}H_{25}O-$ |
| " | $C_{12}H_{25}O-$ | " | $C_{16}H_{33}O-$ |
| $C_8H_{17}O-$ | $C_6H_{13}O-$ | $C_{12}H_{25}O-$ | $C_6H_{13}O-$ |
| " | $C_7H_{15}O-$ | " | $C_7H_{15}O-$ |
| " | $C_8H_{17}O-$ | " | $C_8H_{17}O-$ |
| " | $C_9H_{19}O-$ | " | $C_9H_{19}O-$ |
| " | $C_{10}H_{21}O-$ | " | $C_{10}H_{21}O-$ |
| " | $C_{11}H_{23}O-$ | " | $C_{11}H_{23}O-$ |
| " | $C_{12}H_{25}O-$ | " | $C_{12}H_{25}O-$ |
| $C_9H_{19}O-$ | $C_6H_{13}O-$ | " | $C_{16}H_{33}O-$ |

TABLE 2

Compounds expressed by

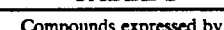
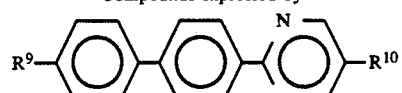

| $R^9$ | $R^{10}$ | $R^9$ | $R^{10}$ |
|---|---|---|---|
| $C_5H_{11}-$ | $C_6H_{13}-$ | $C_5H_{11}O-$ | $C_6H_{13}-$ |

TABLE 2-continued

Compounds expressed by

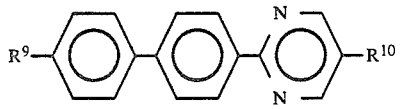

| R⁹ | R¹⁰ | R⁹ | R¹⁰ |
|---|---|---|---|
| " | C₇H₁₅— | " | C₇H₁₅— |
| " | C₈H₁₇— | " | C₈H₁₇— |
| C₆H₁₃— | C₆H₁₃— | C₆H₁₃O— | C₆H₁₃— |
| " | C₇H₁₅— | " | C₇H₁₅— |
| " | C₈H₁₇— | " | C₈H₁₇— |
| C₇H₁₅— | C₆H₁₃— | C₇H₁₅O— | C₆H₁₃— |
| " | C₇H₁₅— | " | C₇H₁₅— |
| " | C₈H₁₇— | " | C₈H₁₇— |
| C₈H₁₇— | C₆H₁₃— | C₈H₁₇O— | C₆H₁₃— |
| " | C₇H₁₅— | " | C₇H₁₅— |
| " | C₈H₁₇— | " | C₈H₁₇— |

As component A, it is preferred to use these two-ring pyrimidine compounds and three-ring pyrimidine compounds in admixture.

The component A in the ferroelectric liquid crystal composition of the present invention plays a role as a base Sc compound and also plays a role of causing a phase series of Iso-N*-S$_A$-Sc* type to appear in the resulting composition, as described above; hence the concentration of component A is preferably 50% by weight or higher. If it is lower than 50% by weight, the quantity of the optically active compound increases relatively, which has a bad influence (e.g. extinction of N* phase) upon the phase series of liquid crystal compositions.

As examples of the base Sc liquid crystal, the following two liquid crystal mixtures and their phase transition points are shown:

Base Sc mixture A

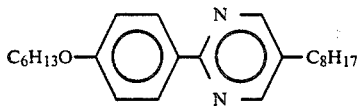 35 wt. %

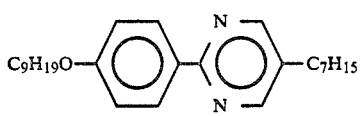 10 wt. %

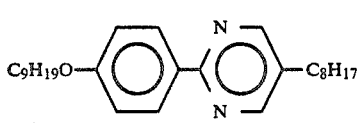 20 wt. %

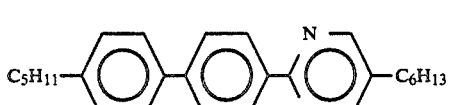 20 wt. %

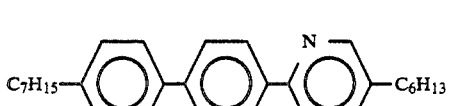 15 wt. %

Cr 6° C.  Sc 64° C.  S$_A$ 71° C.  N 93° C.  Iso

Base Sc mixture B

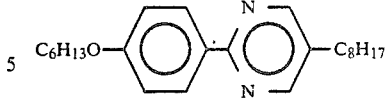 30 wt. %

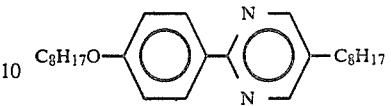 20 wt. %

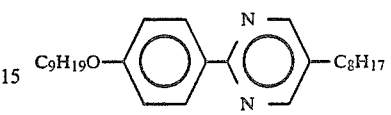 10 wt. %

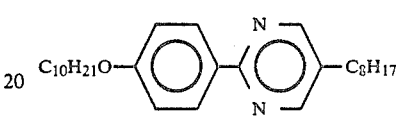 10 wt. %

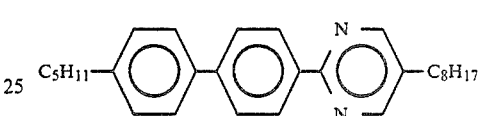 20 wt. %

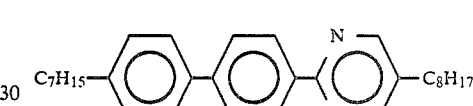 10 wt. %

Cr 4° C.  Sc 65° C.  S$_A$ 79° C.  N 90° C.  Iso

In the ferroelectric liquid crystal composition of the present invention, it is preferred to use a plurality of smectic C liquid crystalline pyrimidine compounds illustrated in the above Tables 1 and 2, but it is also possible to use known achiral smectic C compounds in admixture with the above smectic C pyrimidine compounds within a range where the object of the present invention is not damaged.

For example, compounds abundant in smectic C properties are mentioned such as biphenylyl benzoates, biphenylylcyclohexanes, azo compounds, azoxy compounds, phenylpyridines, biphenyls, etc. Among these compounds, phenylpyridine compounds are preferably used in the ferroelectric liquid crystal composition of the present invention since such compounds afford superior base Sc mixture when they are combined with the pyrimidine derivative compound expressed by the formula (A) or a mixture thereof. The above compounds are often used in order to broaden the Sc* phase temperature range of the resulting ferroelectric liquid crystal composition (reduction in melting point).

The compound expressed by the formula (B) as the component B described above in item (1) has a large spontaneous polarization value so that it contributes to quick response properties. Concrete examples of this compound are compounds expressed by the formulas (B-III), (B-IV) or (B-V). The optically active compounds expressed by the formulas (B-III), (B-IV) or (B-V) are those which have previously been applied for patent by the present applicants (see Japanese patent application laid-open Nos. Sho 63-267763, Sho 64-63571 and Sho 64-50), and have a large spontaneous polarization value and far superior response properties (for example, in the case of the compound of the formula (B-III) wherein $R^{11}=C_6H_{13}O-$ and $R^{12}=-OC_6H_{13}$, phase transition points: Cr 67 Sc* 96 N* 107 Iso, spontaneous polarization value: 327 nC/cm$^2$ (T−Tc=−10° C.), tilt angle: 45° (T−Tc=−10° C.), response time: 45 μsec (T−Tc=−10° C.) and E=5V/μm); and in the case of the compound of the formula (B-IV) wherein $R^{13}=C_9H_{19}-$ and $R^{14}=-OC_3H_7$, phase transition points: Cr 70 Sc* 103 S$_A$ 108 N* 110 Iso, spontaneous polarization value: 243 nC/cm$^2$ (T−Tc=−10° C.), tilt angle: 38° (T−Tc=−10° C.), response time: 30 μsec (T−Tc=−10° C.), and E=5V/μm)). Thus, these compounds play an important role of causing quick response properties to appear in the ferroelectric liquid crystal composition of the present invention.

As the compounds expressed by the formula (B), the following optically active compounds may be mentioned:

those of the formula (B-III) wherein $R^{11}$ represents a linear alkyl group or alkoxy group each of 3 to 10 carbon atoms and $R^{12}$ represents a linear alkyl group or alkoxy group each of 2 to 10 carbon atoms;

those of the formula (B-IV) wherein $R^{13}$ represents a linear alkyl group or alkoxy group each of 3 to 10 carbon atoms and $R^{14}$ represents a linear alkyl group or alkoxy group each of 2 to 10 carbon atoms; and those of the formula (B-V) wherein $R^{15}$ represents a linear alkyl group or alkoxy group each of 3 to 10 carbon atoms and $R^{16}$ represents a linear alkyl group or alkoxy group each of 2 to 10 carbon atoms.

Compounds used as component B are illustrated in the following Tables 3, 4 and 5:

TABLE 3

Compounds expressed by $R^{11}$—⟨phenyl⟩—⟨phenyl⟩—⟨pyrimidine N⟩—O—CH$_2$—*CH(CH$_3$)—OC(=O)—*CH(CH$_3$)—$R^{12}$

| $R^{11}$ | $R^{12}$ | $R^{11}$ | $R^{12}$ |
|---|---|---|---|
| C$_5$H$_{11}$— | —C$_2$H$_5$ | C$_6$H$_{13}$— | —OC$_5$H$_{11}$ |
| C$_5$H$_{11}$— | —C$_6$H$_{13}$ | C$_3$H$_7$— | —OC$_6$H$_{13}$ |
| C$_3$H$_7$— | —OC$_4$H$_9$ | C$_6$H$_{13}$— | —OC$_6$H$_{13}$ |
| C$_5$H$_{11}$— | —OC$_4$H$_9$ | C$_6$H$_{13}$— | —OC$_4$H$_9$ |
| C$_6$H$_{13}$— | —OC$_4$H$_9$ | C$_6$H$_{13}$O— | —OC$_6$H$_{13}$ |
| C$_7$H$_{15}$— | —OC$_4$H$_9$ | | |

TABLE 4

Compounds expressed by $R^{13}$—⟨phenyl⟩—⟨pyridine N⟩—⟨phenyl⟩—O—CH$_2$—*CH(CH$_3$)—OC(=O)—*CH(CH$_3$)—$R^{14}$

| $R^{13}$ | $R^{14}$ | $R^{13}$ | $R^{14}$ |
|---|---|---|---|
| C$_8$H$_{13}$— | —C$_2$H$_5$ | C$_6$H$_{13}$— | —OC$_3$H$_7$ |
| C$_7$H$_{15}$— | —C$_2$H$_5$ | C$_7$H$_{15}$— | —OC$_3$H$_7$ |
| C$_9$H$_{19}$— | —C$_2$H$_5$ | C$_9$H$_{19}$— | —OC$_3$H$_7$ |
| C$_5$H$_{11}$— | —OC$_3$H$_7$ | | |

TABLE 5

Compounds expressed by $R^{15}$—⟨phenyl⟩—⟨phenyl⟩—O—CH$_2$—*CH(CH$_3$)—OC(=O)—*CH(CH$_3$)—$R^{16}$

| $R^{15}$ | $R^{16}$ | $R^{15}$ | $R^{16}$ |
|---|---|---|---|
| C$_7$H$_{15}$— | —OC$_3$H$_7$ | C$_8$H$_{17}$O— | —OC$_4$H$_9$ |
| C$_8$H$_{17}$— | —OC$_3$H$_7$ | C$_{10}$H$_{21}$O— | —OC$_6$H$_{13}$ |

TABLE 5-continued

Compounds expressed by $R^{15}$—⟨phenyl⟩—⟨phenyl⟩—O—CH$_2$—*CH(CH$_3$)—OC(=O)—*CH(CH$_3$)—$R^{16}$

| $R^{15}$ | $R^{16}$ | $R^{15}$ | $R^{16}$ |
|---|---|---|---|
| C$_6$H$_{13}$O— | —OC$_3$H$_7$ | C$_{11}$H$_{23}$O— | —OC$_4$H$_9$ |
| C$_8$H$_{17}$O— | —OC$_3$H$_7$ | | |

In addition, as to the compounds expressed by the formula (B), when the absolute configuration thereof at the optically active site is of (S,S) type or (S,R) type, the polarity of the spontaneous polarization is of − type and the helical twisted sense in Sc* phase is left.

The absolute configuration thereof at the asymmetric center is of (S,S) type or (S,R) type as described above, whereas in the case where the absolute configuration of their antipodes is of (R,R) type or (R,S) type, the polarity of the spontaneous polarization is of + type and the helical twisted sense is right in the Sc* phase.

The component B plays an important role of causing quick response properties to appear in the ferroelectric liquid crystal composition of the present invention, but if it is used in too a large quantity, this has a bad influence upon the phase series of the resulting liquid crystal composition and the spontaneous polarization value increases notably so that there is a possibility that an abnormal phenomenon occurs at the time of switching (for example, see Akio Yoshida et al: The 13th Liquid Crystal Symposium, Japan, p. 142–143 (1987)); thus the concentration of the component B is preferably 30% by weight or less.

The fact that the base Sc compounds expressed by the above formulas (A-I) or (A-II) play an important role as a component of the ferroelectric liquid crystal composition due to their low viscosity is disclosed by the present inventors in Japanese patent application laid-open No. Sho 61-291679.

Further, the fact that the optically active compounds expressed by the formulas (B-III), (B-IV) or (B-V) have a very large spontaneous polarization value and when the optically active compounds are mixed with base Sc liquid crystals as the component A, it is possible to obtain a ferroelectric liquid crystal composition exhibiting a very quick electrooptical response, is also disclosed by the present inventors in Japanese patent application laid-open No. Hei 2-145,683 or Japanese patent application No. Hei 1-86715.

However, the most specific features of the present invention consists in that superior specific features of the optically active compounds expressed by the formulas (C-VI) to (C-IX), as the component C have been found and also this component C has been combined with the abovementioned components A and B.

Namely, the optically active compounds expressed by the formulas (C-VI) to (C-IX) as the component C have the same polarity of spontaneous polarization as that of the optically active compounds expressed by the formulas (B-III) to (B-V) and have an opposite helical twisted sense to that of the latter compounds; hence the compounds as the component C function as an agent for compensating the helical twisting power of the optically active compounds as the component B and play a role of lengthening the helical pitch of the resulting liquid crystal composition. Further, the compounds of the component C also have superior response properties and when they are combined with the optically active compounds expressed by the formula (B), as the component B, it is possible to obtain a ferroelectric liquid crystal composition having a long helical pitch and quick response properties. Concrete examples of the compounds are those expressed by the formulas (C-VI) to (C-IX), etc. (see EP 0306195, Japanese patent application laid-open No. Sho 62-106061, etc.).

Preferable compounds of the component C are the following optically active compounds:

those of the formula (C-VI) wherein $R^{17}$ represents a linear alkyl group or alkoxy group each of 3 to 12 carbon atoms and $R^{18}$ represents a linear alkyl group of 2 to 10 carbon atoms, those of the formula (C-VII) wherein $R^{19}$ represents a linear alkyl group or alkoxy group each of 3 to 12 carbon atoms and $R^{20}$ represents an alkyl group of 2 to 10 carbon atoms, those of the formula (C-VIII) wherein $R^{21}$ represents a linear alkyl group or alkoxy group each of 3 to 12 carbon atoms and $R^{22}$ represents a linear alkyl group of 2 to 10 carbon atoms, and those of the formula (C-IX) wherein $R^{23}$ represents an alkyl group or alkoxy group each of 3 to 12 carbon atoms and $R^{24}$ represents a linear alkyl group of 2 to 10 carbon atoms.

Representative compounds of the formula (C) are as follows:

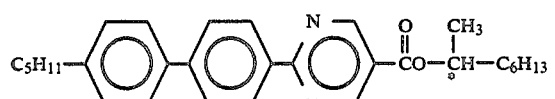

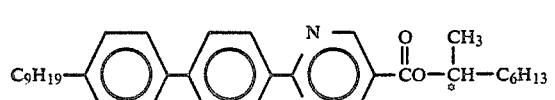

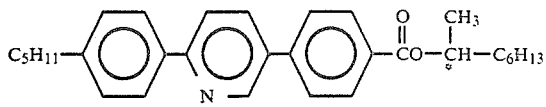

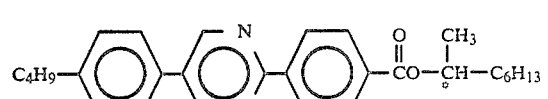

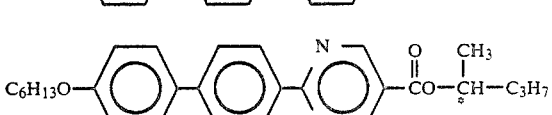

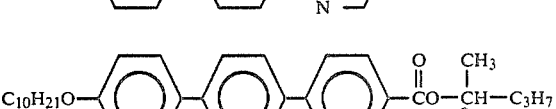

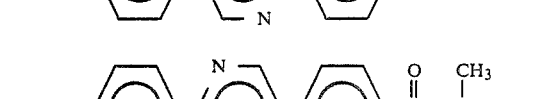

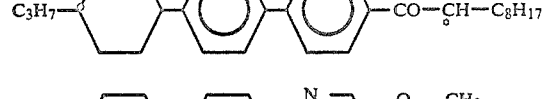

In addition, as to the compounds expressed by the formula (C), in the case where the absolute configuration at the optically active site thereof is of the R type, the polarity of the spontaneous polarization is of − type and the helical twist sense is right, while in the case where the absolute configuration of the antipodes of the compounds is of the S type, the polarity is of + type and the helical sense is left. Thus, in the case where the absolute configuration of the compounds expressed by the formula (B) as the component B is of (S,S) type or (S,R) type, when the compounds are combined with compounds expressed by the formula (C) as the component C having an absolute configuration of the R type, then it is possible to obtain a ferroelectric liquid crystal composition having a long helical pitch.

Further, in the case where optically active compounds expressed by the formula (B) as the component B having an absolute configuration of the (R,R) type or (R,S) type are used, compounds expressed by the formula (C) as the component C and having an absolute configuration of the S type are mixed with the above compounds so that the helical pitch of the resulting mixture is adjusted.

The component C functions mainly as an agent for compensating the helical twisting power of the component B in the ferroelectric liquid crystal composition of the present invention and plays a role of lengthening the helical pitch of the resulting liquid crystal composition without damaging its response properties, but if it is used in too a large quantity, the upper limit temperature of Sc* phase lowers or the phase series of Iso-N*-S$_A$-Sc* type is affected adversely since the component C is insufficient in N* properties; thus the concentration of the component C is preferably 20% by weight or less.

Here, with regard to quick electrooptical response as one of the specific features of the component C, an optically active compound (a) as a typical example of compounds of the component C of the present invention will be compared with optically active compounds (b) or (c), described in Japanese patent application Nos. Sho 63-298156 and Hei 1-86715, each used as a helical pitch-adjusting agent for a mixture comprising components A and B of the present invention. The comparison will be made on several characteristics of the mixtures including electrooptic response properties as a superior specific feature of the component C (see Table 6 later).

The optically active compounds (a), (b) and (c) are as follows:

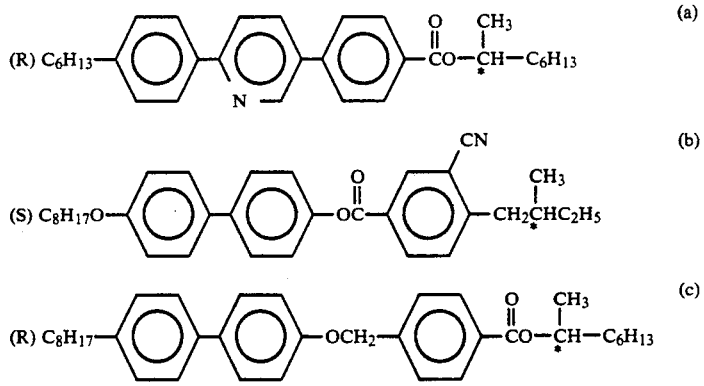

These compounds were respectively added in 20 parts by weight to the above base Sc mixture B (80 parts by weight). Various specific features of the resulting ferroelectric liquid crystal compositions are shown in Table 6.

TABLE 6

| Specific features | | Phase transition points (°C.) | | | | Spontaneous polarization value nC/cm$^2$ | Tilt angle (°) | Helical pitch (μm) | Response time (μsec) |
|---|---|---|---|---|---|---|---|---|---|
| | | Cr | Sc* | S$_A$ | N* | Iso | | | |
| Optically active compound | (a) | • 5 | • 57 | • 87 | | • | 6.1 | 13.5 | 1.9 | 46 |
| | (b) | • 7 | • 68 | • 83 | • 90 | • | 5.2 | 19.4 | 2.3 | 305 |
| | (c) | • 4 | • 46 | • 90 | | • | 5.6 | 11.5 | 2.1 | 96 |

The measured temperature: 25° C.
The electric field strength at the time of measurement of response time: 5 V/μm.

As apparent from Table 6, the helical pitches of these three kinds of optically active compounds are almost the same. Namely, it can be said that these three kinds of optically active compounds (a), (b) and (c) each have a similar function as a helical pitch-adjusting agent. Whereas, when the respective response times are compared, a surprising fact is seen. Namely, the optically active compound expressed by the formula (C-VII) as the component C of the present invention is far superior in the response properties to optically active compounds used previously. Optically active compounds such as (b) or (c) each as a helical pitch-adjusting agent so far used for ferroelectric liquid crystal compositions comprising an achiral compound as the component A and an optically active compound as the component B have raised a problem of response properties and have had a bad influence upon the response properties of the resulting liquid crystal compositions. Whereas, since optically active compounds such as the component C of the present invention are also far superior in response properties, they have no bad influence upon the response properties of the resulting liquid crystal compositions. Namely, when the components A, B and C of the present invention are combined together, it is possible to obtain a ferroelectric liquid crystal composition having far superior response properties.

The proportions of the respective components for obtaining a ferroelectric liquid crystal composition having superior specific features, aimed in the present invention, making use of the above respective specific features of the components A, B and C, have been extensively researched, and as a result, the preferable ranges of the proportions of the components A, B and C were as follows:

component A: 50 to 91% by weight,
component B: 4 to 30% by weight and
component C: 5 to 20% by weight.

If the quantities of the respective components blended are less than the above respective lower limits, the functions and effectiveness brought about by the respective components are insufficient.

When liquid crystal compounds were combined together as in the present invention, it was possible to obtain a ferroelectric liquid crystal composition having very quick response properties and exhibiting Sc* phase within a broad temperature range including room temperature.

Further, the light-switching element containing the liquid crystal composition of the present invention exhibited a very good contrast, a clear switching operation and a very high speed response, in both of birefringence display mode and guest-host display mode.

EXAMPLE

The present invention will be described in more detail by way of the following examples, but it should not be construed to be limited thereto.

Various measurements in the following examples were carried out according to the following methods:

Spontaneous polarization value (Ps): measured according to Sawyer-Tower method.

Tilt angle ($\theta$): sought by microscopic observation of a homogeneously aligned liquid crystal cell on a rotating stage under crossed nicols in which observation an extinction position is determined by first impressing an electric field sufficiently higher than the critical voltage to unwind the helical structure of th liquid crystal, followed by reversing the polarity of the impressed field to obtain another extinction position, to afford an angle (corresponding to $2\theta$) by rotating the stage from the first extinction position to the other extinction position.

Response time: sought by placing the respective compositions in a cell subjected to aligning treatment and having a gap between electrodes of 2 $\mu$m, followed by measuring the change in the intensity of transmitted light at the time of impressing a square wave of 1 KHz under a peak to peak voltage Vpp of 20 V.

Sc* pitch: sought by directly measuring the distance between dechiralization lines corresponding to the helical pitch under a polarizing microscope, using a cell of about 200 $\mu$m in cell thickness subjected to homogeneous alignment.

N* pitch: indirectly sought by measuring the distance (l) between disclination lines under a polarizing microscope using a wedge type cell, and employing a theoretical equation of P (pitch) $=2\ l\ \tan\theta$ wherein $\theta$ represents the angle of the wedge.

EXAMPLE 1

Using compounds expressed by the formulas (A-I), (A-II), (B-III) and (C-VII), a ferroelectric liquid crystal composition having the following proportions was prepared:

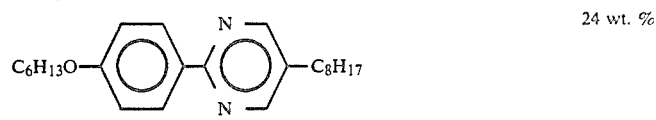

24 wt. %

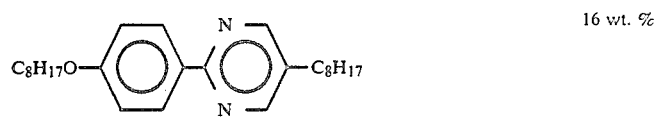

16 wt. %

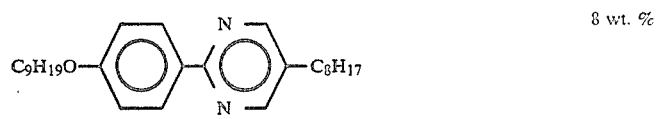

8 wt. %

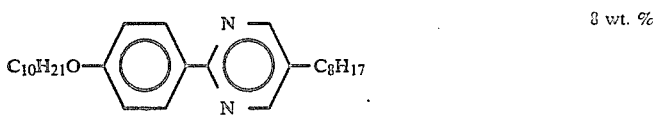

8 wt. %

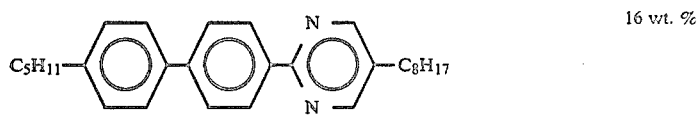

16 wt. %

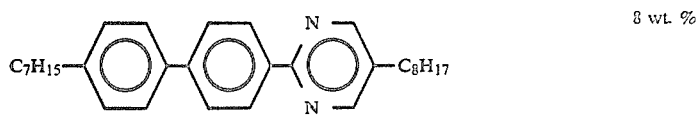

8 wt. %

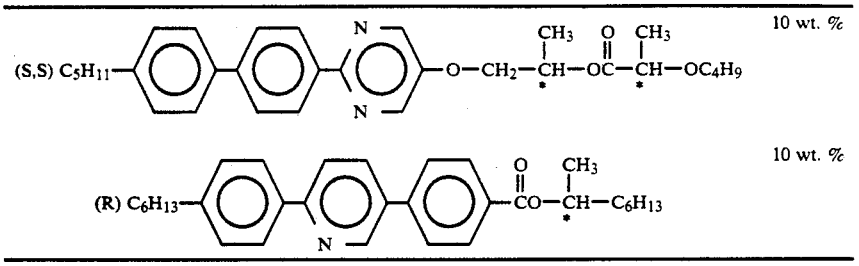

The above ferroelectric liquid crystal composition exhibited the following phase transition points:

The spontaneous polarization value at 25° C. was 29 nC/cm², the tilt angle was 21° and the response time was 52 μsec. Further, the helical pitch of the N* phase at 81° C. was 13 μm and that of the Sc* phase at 25° C. was 6 μm.

In addition, this liquid crystal composition was placed in a cell of 2 μm in cell gap, provided with transparent electrodes each subjected to parallel aligning treatment by having a polyimide as an aligning agent coated and rubbing the resulting surface, followed by gradually cooling the composition from the N* phase to the Sc* phase at a temperature-lowering rate of 1° C./min., providing a pair of polarizers in a crossed nicol state and observing the alignment by means of a microscope. As a result, a uniform alignment having no fault was obtained. The contrast ratio at that time was 1:20.

As apparent from the foregoing, when compounds of three components A, B and C expressed by the formulas (A-I), (A-II), (B-III) and (C-VII) were combined together, a ferroelectric liquid crystal composition exhibiting a Sc* phase within a broad temperature range including room temperature, having a phase series of Iso-N*-S$_A$-Sc* type and having a long helical pitch and yet quick response properties was obtained. Further, when this liquid crystal composition was used, a superior alignment was easily obtained and a liquid crystal element having a very good contrast was obtained.

COMPARATIVE EXAMPLE 1

In place of the compound of the formula (C-VII) used in Example 1 as component C, the following optically active compound was used:

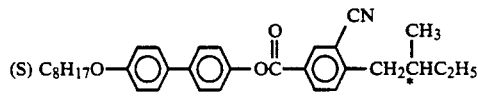

to prepare a ferroelectric liquid crystal composition, and its phase transition points, spontaneous polarization value, tilt angle, helical pitch and response time were measured. The results are shown below.

Phase transition points:

Spontaneous polarization value (at 25° C.): 25 nC/cm²
Tilt angle (at 25° C.): 24°
Helical pitch (at 25° C.): 5 μm
Response time (at 25° C.): 153 μsec

EXAMPLES 2-8

Ferroelectric liquid crystal compositions having the proportions described in Table 7 were prepared in the same manner as in Example 1 and evaluated according to the same measurement methods as described above. The specific features of the liquid crystal compositions of Examples 2-8 are shown in Table 8.

COMPARATIVE EXAMPLES 2 AND 3

The cases wherein the proportions of the components A, B and C of the present invention were outside those defined in the present invention are shown in Tables 7 and 8.

TABLE 7
| Component | Compound | 2 | 3 | 4 | 5 | 6 | 7 | 8 | Comp. ex. 2 | Comp. ex. 3 |
|---|---|---|---|---|---|---|---|---|---|---|
| A | 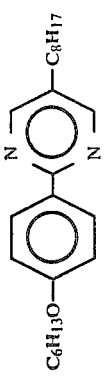 C$_6$H$_{13}$O–⬡–(pyridine)–C$_8$H$_{17}$ | 26.3 | 17.5 | 26.3 | 21 | 31.5 | 28 | 24 | 27 | 14 |
|   | 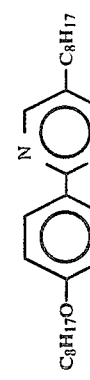 C$_8$H$_{17}$O–⬡–(pyridine)–C$_8$H$_{17}$ |  |  |  |  |  | 5.5 | 16 | 18 | 4 |
|   | 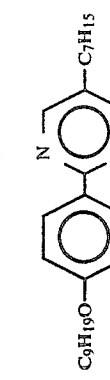 C$_9$H$_{19}$O–⬡–(pyridine)–C$_7$H$_{15}$ | 7.5 | 5 | 7.5 | 6 | 9 | 8 | 8 | 9 | 8 |
|   | 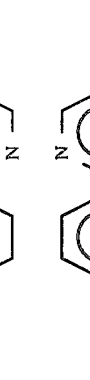 C$_9$H$_{19}$O–⬡–(pyridine)–C$_8$H$_{17}$ |  |  | 7 |  |  |  |  |  |  |
|   | 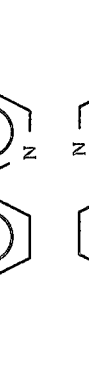 C$_{10}$H$_{21}$O–⬡–(pyridine)–C$_8$H$_{17}$ | 15 | 10 | 15 | 12 | 18 | 16 | 8 | 9 | 8 |
|   | 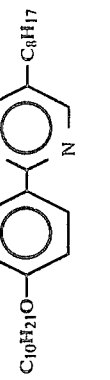 C$_5$H$_{11}$–⬡–⬡–(pyridine)–C$_6$H$_{13}$ | 15 | 10 | 15 | 17 | 18 | 16 | 8 | 3 | 8 |
|   | 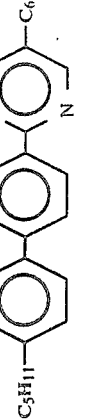 C$_5$H$_{11}$–⬡–⬡–(pyridine)–C$_8$H$_{17}$ | 4 | 5 | 4 | 5 |  | 4 | 16 | 18 |  |
|   | 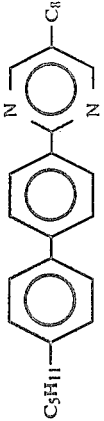 C$_7$H$_{15}$–⬡–⬡–(pyridine)–C$_6$H$_{13}$ | 11.2 | 7.5 | 11.2 | 14 | 13.5 | 12 |  |  | 6 |

TABLE 7-continued

| Component | Compound | Example No. | | | | | | | | Comp. ex. No. | |
|---|---|---|---|---|---|---|---|---|---|---|---|
| | | 2 | 3 | 4 | 5 | 6 | 7 | 8 | | 2 | 3 |
| B | [pyridine-phenyl-phenyl compound with $C_7H_{15}$ and $C_8H_{17}$] | | | | | | | | | | |
| | (S,S) $C_3H_7$ — [phenyl-phenyl-pyridyl]—$O-CH_2-CH(CH_3)-*CH(CH_3)-OC-CH(CH_3)-*CH-OC_4H_9$ (O=) | 9 | 5 | 3 | | | | | | | |
| | (S,S) $C_5H_{11}$ — [phenyl-phenyl-pyridyl]—$O-CH_2-*CH(CH_3)-OC-CH(CH_3)-*CH-OC_4H_9$ (O=) | | 5 | | | 4 | 4.5 | 10 | | | 10 |
| | (S,S) $C_5H_{11}$ — [phenyl-phenyl-pyridyl]—$O-CH_2-*CH(CH_3)-OC-CH(CH_3)-*CH-OC_6H_{13}$ (O=) | | 5 | | 5 | | | | | | 5 |
| | (S,S) $C_7H_{15}$ — [phenyl-phenyl-pyridyl]—$O-CH_2-*CH(CH_3)-OC-CH(CH_3)-*CH-OC_4H_9$ (O=) | | | | 5 | | | | | | |
| | (S,S) $C_6H_{13}$ — [phenyl-phenyl-pyridyl]—$O-CH_2-*CH(CH_3)-OC-CH(CH_3)-*CH-OC_3H_7$ (O=) | | 5 | | | | | | | | |
| | (S,S) $C_6H_{13}$ — [phenyl-pyridyl-phenyl]—$O-CH_2-*CH(CH_3)-OC-CH(CH_3)-*CH-OC_2H_5$ (O=) | | 5 | | | | | | | | 5 |
| | (S,S) $C_7H_{15}$ — [phenyl-phenyl-pyridyl]—$O-CH_2-*CH(CH_3)-OC-CH(CH_3)-*CH-OC_4H_9$ (O=) | | | | | | | | | 3 | 10 |

TABLE 7-continued

| Component | Compound | Example No. 2 | 3 | 4 | 5 | 6 | 7 | 8 | Comp. ex. No. 2 | 3 |
|---|---|---|---|---|---|---|---|---|---|---|
| | (S,S) C9H19 — phenyl-pyridyl-phenyl — O—CH2—CH(CH3)—OC(=O)—CH(CH3)—OC3H7 | | | | 2.5 | | | | | |
| | (S,S) C8H17O — biphenyl — O—CH2—CH(CH3)—OC(=O)—CH(CH3)—OC4H9 | | 5 | | | | | | | 5 |
| | (S,S) C11H23O — biphenyl — O—CH2—CH(CH3)—OC(=O)—CH(CH3)—OC4H9 | | | 3 | | | | | | |
| C | (R) C5H11 — pyrimidine-phenyl — CO—O—CH(CH3)—C6H13 | | 5 | | 2.5 | | | 10 | | 5 |
| | (R) C9H19 — pyrimidine-phenyl — CO—O—CH(CH3)—C6H13 | 12 | | 4 | | | | | | 5 |
| | (R) C5H11 — phenyl-pyridyl — CO—O—CH(CH3)—C6H13 | | 5 | | 5 | 6 | | | | |
| | (R) C6H13 — phenyl-pyridyl — CO—O—CH(CH3)—C6H13 | | 5 | 4 | | | 6 | | 4 | 5 |

TABLE 8

| Specific features | Example No. 2 | 3 | 4 | 5 | 6 | 7 | 8 | Comp. ex. No. 2 | 3 |
|---|---|---|---|---|---|---|---|---|---|
| Phase transition points (°C.) | | | | | | | | | |
| Cr→Sc* | −8 | −13 | −6 | −10 | −5 | −8 | −7 | −2 | −6 |
| Sc*→S$_A$ | 63 | 62 | 63 | 62 | 63 | 63 | 60 | 64 | 53 |
| S$_A$→N* | 85 | 89 | 81 | 82 | 78 | 79 | 75 | 82 | — |
| N*→Iso | 96 | 94 | 95 | 93 | 93 | 95 | 85 | 89 | 87[3] |
| Spontaneous polarization value[1] (nC/cm$^2$) | 30 | 70 | 19 | 32 | 12 | 14 | 25 | 7 | 105 |
| Tilt angle[1] (°) | 21 | 22 | 22 | 23 | 23 | 22 | 21 | 20 | 18 |
| Helical pitch (μm) | | | | | | | | | |
| N* phase[2] | 14 | 10 | 18 | 12 | 20 | 13 | 25 | 14 | 4 |
| Sc* phase[1] | 6 | 4 | 8 | 7 | 7 | 6 | 8 | 7 | 2 |
| Response time[1] (μsec) | 56 | 48 | 74 | 53 | 86 | 86 | 59 | 175 | 136 |

[1]Value at 25° C.
[2]Value measured at a temperature higher than S$_A$→N* phase transition point by 1° C.
[3]S$_A$→Iso phase transition point (N* phase is not exhibited)

EXAMPLE 9

The ferroelectric liquid crystal composition prepared in Example 2 was placed in a cell of 2 μm in cell gap, provided with transparent electrodes each having a polyimide as an aligning agent coated and the surface subjected to parallel aligning treatment by rubbing to prepare a liquid crystal cell. This liquid crystal cell was placed between two sheets of polarizers arranged in a crossed nicol state, followed by impressing a square wave having a low frequency of 0.5 Hz and 2 0 V. As a result, a liquid crystal display element having a very good contrast (1:20), a clear switching operation and a response time at 25° C. as quick as 32 μsec was obtained.

EXAMPLE 10

To the ferroelectric liquid crystal composition prepared in Example 8 was added an anthraquinone dyestuff D-16 (made by BDH Co., Ltd.) expressed by the formula

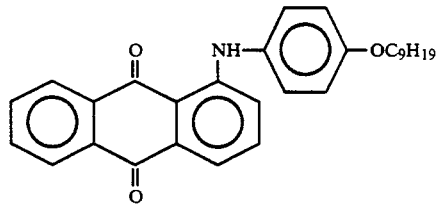

in a concentration of 3% by weight to obtain a composition of the guest-host mode. This composition was placed in a cell of 8 μm distance in cell gap, subjected to the same treatment as in Example 9, followed by arranging one sheet of polarizer so that the polarization plane might be parallel to the molecular axis and impressing an alternating current having a low frequency of 0.5 Hz and 40 V. As a result, a color liquid crystal display element having a very good contrast (1:10), a clear switching operation and a response time at 25° C. as quick as 80 μsec was obtained.

EXAMPLE 11

Using compounds expressed by the formulas (A-I), (A-II), (B-III), (B-V) and (C-VII), a ferroelectric liquid crystal composition having the following proportions was prepared:

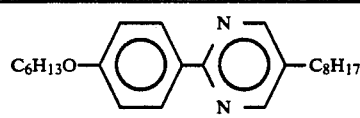  15.9 wt. %

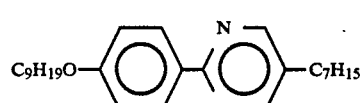  3.4 wt. %

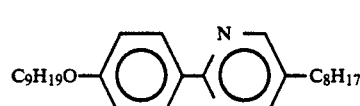  6.8 wt. %

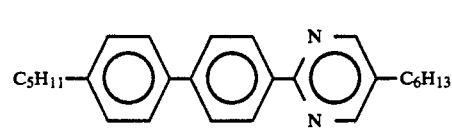  14.8 wt. %

-continued

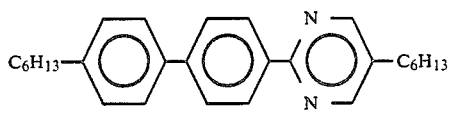 4 wt. %

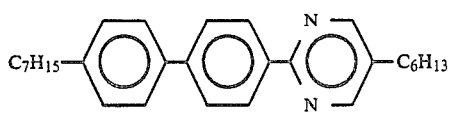 9.1 wt. %

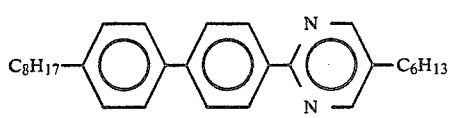 4 wt. %

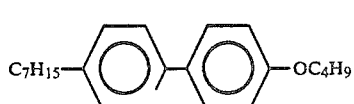 4 wt. %

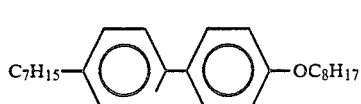 4 wt. %

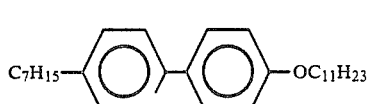 4 wt. %

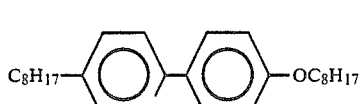 4 wt. %

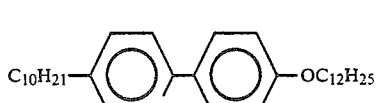 4 wt. %

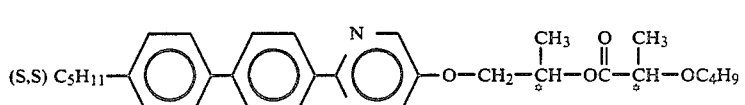 4 wt. %

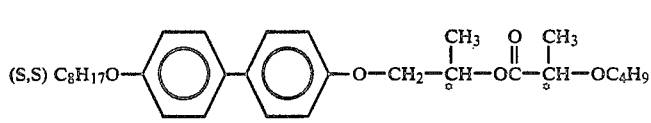 6 wt. %

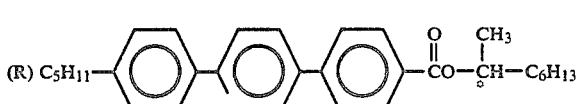 12 wt. %

This ferroelectric liquid crystal composition exhibited the following phase transition points:

It exhibited a spontaneous polarization value of 32 nC/cm², a tilt angle of 21° and a response time of 55 μsec, each at 25° C. Further, the pitch of N* phase at 89° C. was 27 μsec and that of Sc* phase at 25° C. was 8 μm.

EXAMPLE 12

A ferroelectric liquid crystal composition consisting of the following compounds and having the following proportions was prepared:

| Structure | wt% |
|---|---|
| C₆H₁₃O–⟨phenyl⟩–⟨pyrimidine(N,N)⟩–C₈H₁₇ | 13.4 wt. % |
| C₉H₁₉O–⟨phenyl⟩–⟨pyrimidine(N,N)⟩–C₇H₁₅ | 2.4 wt. % |
| C₉H₁₉O–⟨phenyl⟩–⟨pyrimidine(N,N)⟩–C₈H₁₇ | 4.8 wt. % |
| C₅H₁₁–⟨phenyl⟩–⟨phenyl⟩–⟨pyrimidine(N,N)⟩–C₆H₁₃ | 13.8 wt. % |
| C₆H₁₃–⟨phenyl⟩–⟨phenyl⟩–⟨pyrimidine(N,N)⟩–C₆H₁₃ | 5 wt. % |
| C₇H₁₅–⟨phenyl⟩–⟨phenyl⟩–⟨pyrimidine(N,N)⟩–C₆H₁₃ | 8.6 wt. % |
| C₈H₁₇–⟨phenyl⟩–⟨phenyl⟩–⟨pyrimidine(N,N)⟩–C₆H₁₃ | 5 wt. % |
| C₇H₁₅–⟨pyridine(N)⟩–⟨phenyl⟩–OC₄H₉ | 5 wt. % |
| C₇H₁₅–⟨pyridine(N)⟩–⟨phenyl⟩–OC₈H₁₇ | 5 wt. % |
| C₇H₁₅–⟨pyridine(N)⟩–⟨phenyl⟩–OC₁₁H₂₃ | 5 wt. % |
| C₈H₁₇–⟨pyridine(N)⟩–⟨phenyl⟩–OC₈H₁₇ | 5 wt. % |
| C₁₁H₂₁–⟨pyridine(N)⟩–⟨phenyl⟩–OC₁₂H₂₅ | 5 wt. % |
| (S,S) C₅H₁₁–⟨phenyl⟩–⟨phenyl⟩–⟨pyrimidine(N,N)⟩–O–CH₂–*CH(CH₃)–O–C(=O)–*CH(CH₃)–OC₄H₉ | 10 wt. % |

-continued

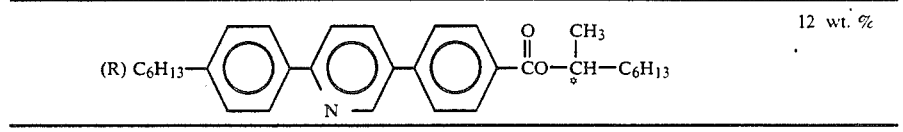
12 wt. %

The ferroelectric liquid crystal composition exhibited the following phase transition points:

The composition exhibited a spontaneous polarization value of 43 nC/cm$^2$, a tilt angle of 26° and a response time of 74 μsec, each at 25° C.

Its N* phase pitch at 91° C. was 23 μm and its Sc* phase pitch at 25° C. was 10 μm.

What we claim is:

1. A ferroelectric liquid crystal composition comprising at least three components including the following components A, B and C, the respective contents of said components A, B and C being 50 to 91% by weight, 4 to 30% by weight and 5 to 20% by weight, respectively, based upon the total quantity of said three components:

component A being at least one member selected from the group consisting of compounds expressed by the formula

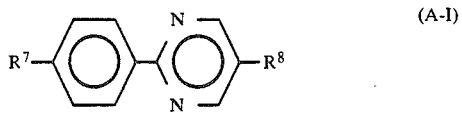

wherein $R^7$ and $R^8$ each represent the same or different, linear or branched alkyl group, alkoxy group or alkanoyloxy group each of 1 to 18 carbon atoms and compounds expressed by the formula

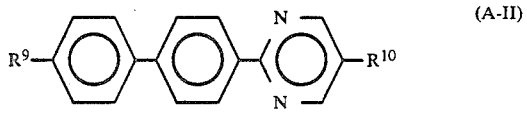

wherein $R^9$ and $R^{10}$ each represent the same or different, linear or branched alkyl group or alkoxy group each of 1 to 18 carbon atoms, and both of which compounds (A-I) and (A-II) having a smectic C phase;

component B being at least one member selected from the group consisting of optically active compounds expressed by the following three formulas and having the same sense of spontaneous polarization in a chiral smectic C phase, induced when dissolved in a smectic C liquid crystal:

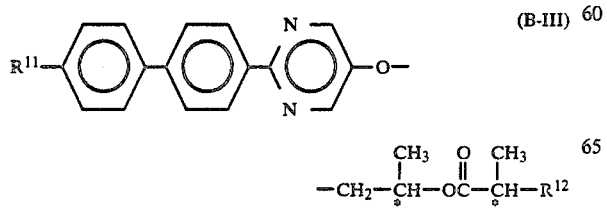

wherein $R^{11}$, $R^{13}$ and $R^{15}$ each represent a linear or branched alkyl group or alkoxy group each of 1 to 18 carbon atoms, $R^{12}$, $R^{14}$ and $R^{16}$ each represent a linear or branched alkyl group each of 2 to 18 carbon atoms or a linear or branched alkoxy group each of 1 to 18 carbon atoms and * represents an asymmetric carbon atom; and component C being at least one member selected from the group consisting of optically active compounds expressed by the following formulas and having the same sense of spontaneous polarization in a chiral smectic C phase, induced when dissolved in a smectic C liquid crystal, as that of said component B:

wherein $R^{17}$, $R^{19}$, $R^{21}$ and $R^{23}$ each represent a linear or branched alkyl group or alkoxy group each of 1 to 18 carbon atoms, $R^{18}$, $R^{20}$, $R^{22}$ and $R^{24}$ each represent a linear or branched alkoxy group each of 2 to 18 carbon atoms or a linear or branched alkoxy group each of 1 to 18 carbon atoms and * represents an asymmetric carbon atom.

2. A ferroelectric liquid crystal composition according to claim 1, wherein said component A is at least one member selected from the groups consisting of compounds expressed by the formula

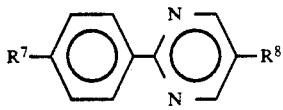

wherein $R^7$ represents a linear alkyl group, alkoxy group or alkanoyloxy group each of 5 to 14 carbon atoms and $R^8$ represents a linear alkyl group or alkoxy group each of 6 to 16 carbon atoms, and compounds expressed by the formula

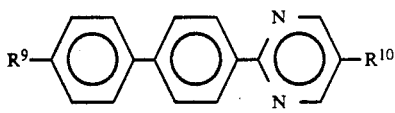

wherein $R^9$ and $R^{10}$ each represent a linear alkyl group or alkoxy group each of 5 to 10 carbon atoms, and both of which compounds have a smectic C phase.

3. A ferroelectric liquid crystal composition according to claim 1, wherein said component A is at least one member selected from the group consisting of compounds expressed by the formula

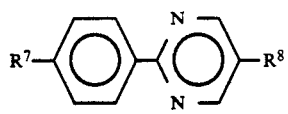

where $R^7$ represents a linear alkoxy group of 6 to 12 carbon atoms and $R^8$ represents a linear alkyl group of 7 to 15 carbon atoms, and compounds expressed by the formula

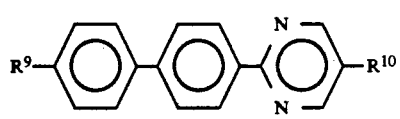

wherein $R^9$ represents a linear alkyl group or alkoxy group of 5 to 8 carbon atoms and $R^{10}$ represents a linear alkyl group of 6 to 8 carbon atoms, and both of which compounds have smectic C phase.

4. A ferroelectric liquid crystal composition according to claim 1, wherein said component B is at least one member selected from the group consisting of optically active compounds expressed by the following three formulas and having the same sense of spontaneous polarization in a chiral smectic C phase, induced when dissolved in a smectic C liquid crystal:

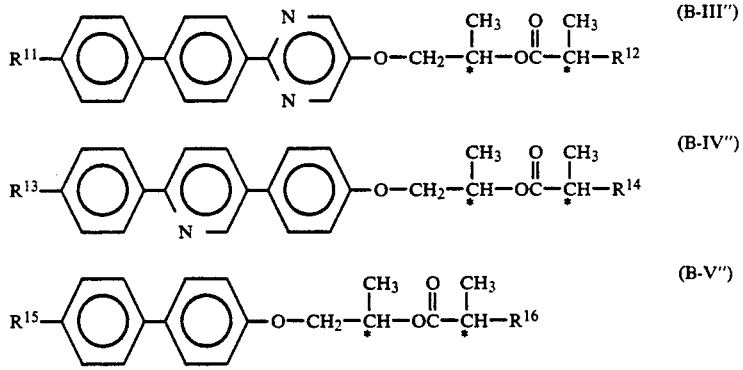

wherein $R^{11}$ and $R^{13}$ each represent a linear alkyl group or alkoxy group, each of 3 to 10 carbon atoms, $R^{15}$ represents a linear alkyl group or alkoxy group, each of 3 to 12 carbon atoms, $R^{12}$, $R^{14}$ and $R^{16}$ each represent a linear alkyl group or alkoxy group each of 2 to 10 carbon atoms and * represents an asymmetric carbon atom.

5. A ferroelectric liquid crystal composition according to claim 1, wherein said component C is at least one member selected from the group consisting of optically active compounds expressed by the following four formulas and having the same sense of spontaneous polarization in a chiral smectic C phase, induced when dissolved in a smectic C liquid crystal, to that of the compound of said component B:

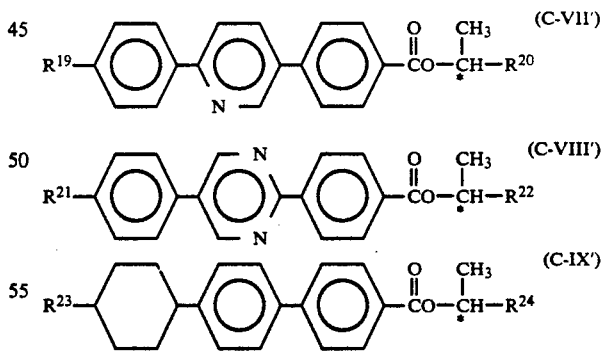

wherein $R^{17}$, $R^{19}$, $R^{21}$ and $R^{23}$ each represent a linear alkyl group or alkoxy group, each of 3 to 12 carbon atoms, $R^{18}$, $R^{20}$, $R^{22}$ and $R^{24}$ each represent a linear alkyl group of 2 to 10 carbon atoms and * represents an asymmetric carbon atom.

6. A light-switching element containing a ferroelectric liquid crystal composition as set forth in claim 1.

* * * * *

UNITED STATES PATENT AND TRADEMARK OFFICE
CERTIFICATE OF CORRECTION

PATENT NO. : 5,102,576

DATED : April 7, 1992

INVENTOR(S) : Terashima et al.

It is certified that error appears in the above-identified patent and that said Letters Patent is hereby corrected as shown below:

ON THE TITLE PAGE

In item no. [57], Abstract, line 2, change "compounds(s)" to --compound(s)--.

Formula A, line 1, change "1" to -- $\ell$ -- ;

line 13, change "1" to -- $\ell$ -- ;

line 14, change "1" to -- $\ell$ --.

Column 36, line 63, change "alkoxy" to --alkyl--.

Signed and Sealed this

Tenth Day of August, 1993

Attest:

MICHAEL K. KIRK

*Attesting Officer*   *Acting Commissioner of Patents and Trademarks*